April 14, 1964     H. KYLIN ETAL     3,128,665
MUSICAL NOTE METER
Filed Sept. 6, 1962     2 Sheets-Sheet 1
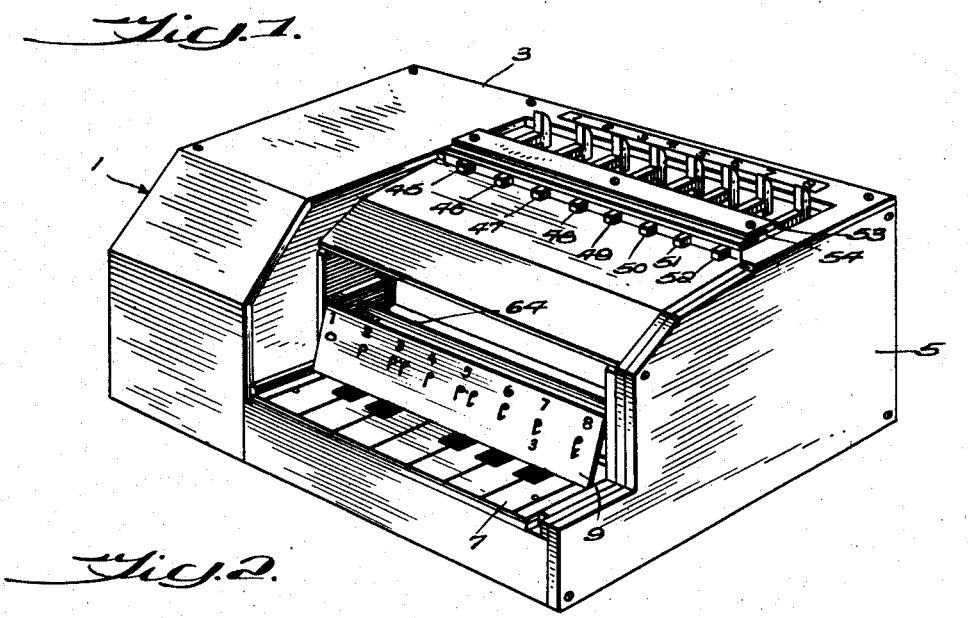
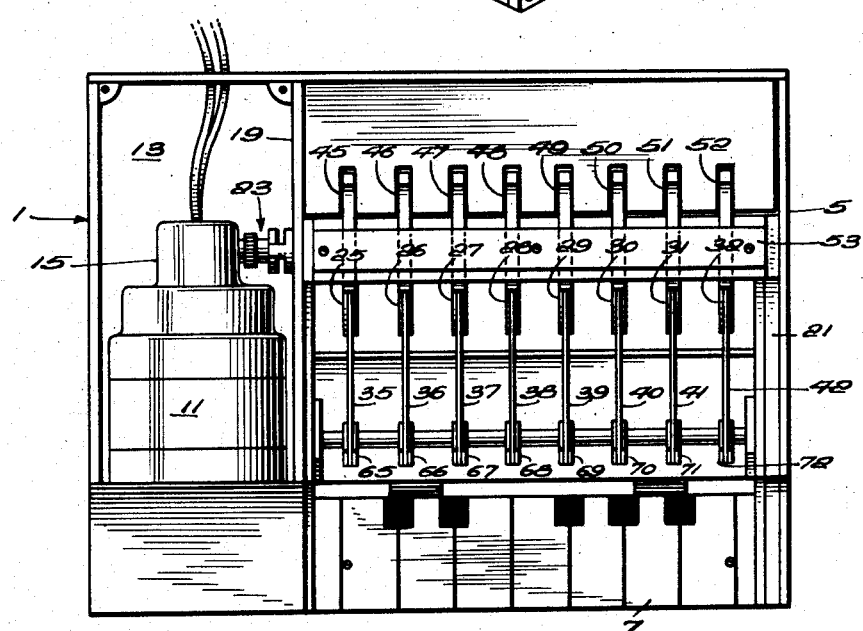
INVENTORS
HJALMAR KYLIN,
ANNE KYLIN,

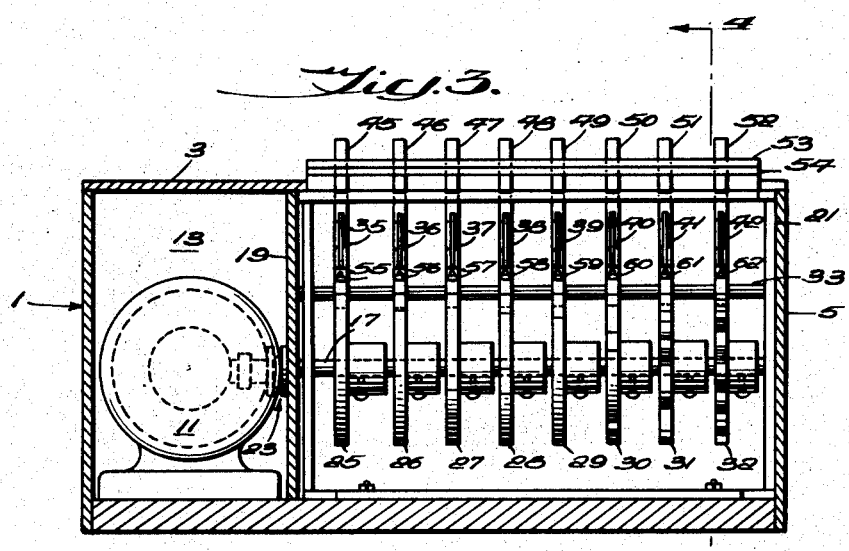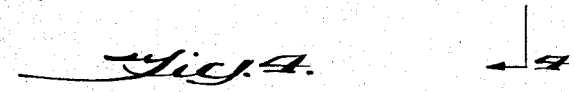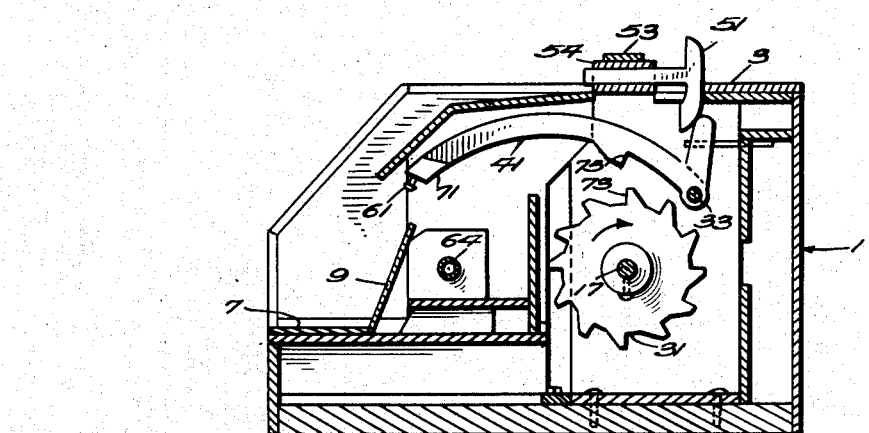

United States Patent Office 3,128,665
Patented Apr. 14, 1964

3,128,665
MUSICAL NOTE METER
Hjalmar Kylin and Anne Kylin, both of 104 W. Cedar St., Alexandria, Va.
Filed Sept. 6, 1962, Ser. No. 221,686
3 Claims. (Cl. 84—484)

This invention relates to a musical note meter, and more particularly to a device useful for teaching the relative values of selected time interval measurements in musical notation.

One of the most difficult areas in the field of instructing students in basic musical theory and performance is the concept of rhythm and meter. Conventional music notation employs as symbols notes having different values of time duration. In order to acquire the proper sense of rhythm necessary for a good foundation upon which to build advanced studies, it is necessary for the music student to master the relative time values of the notations employed. It has been conventional in the past to employ a mechanical device known as a metronome for establishing the sense of the fundamental meter or beat of a musical composition. However, within this fundamental meter there usually appear rhythmic variations which do not violate the fundamental meter, but which exhibit a pattern that is not demonstrable on the metronome. Obvious illustrations of irregular rhythms are found in the use of triplets and syncopated rhythms in which the musical accent falls upon normally unaccented beats of a measure.

In the teaching of complicated rhythmic variations it is often desirable to be able to demonstrate simultaneously different fundamental beats regularly recurring within a repeated interval of time. Synchronized irregular rhythms such as two beats against three beats and three beats against four beats are examples of such variations. The metronome, which is capable of producing only a single fundamental beat, is ineffective for this purpose, and the use of a plurality of metronomes set to different fundamental beats presents an almost insurmountable problem in synchronization. Accordingly, it is a feature of this invention to provide a device for indicating both audibly and visibly the relative time values of the various musical notations.

It is another feature of this invention to provide a device for indicating both audibly and visibly two or more sets of fundamental beats occurring within a given time interval.

A further feature of the invention is the provision of a device for indicating both audibly and visibly the relationship of a secondary rhythm to a fundamental rhythm.

Another feature of the invention is the provision of a device having a plurality of selectable time values which may be sounded and observed visually individually or simultaneously.

In accordance with the invention these features are realized in a structure comprising a housing member which contains an electric motor having a driven shaft coupled thereto. A plurality of cams, each having a predetermined profile about its periphery corresponding to the given musical notation simulated, are mounted on the shaft fixedly for simultaneous rotation. A second shaft, having a plurality of baton elements pivotally mounted thereon, is located within the housing. Each baton element is provided with a cam follower on its lower surface to engage the peripheral surface of one of the cams on the driven shaft. A plurality of draw bars are arranged in such position as to act upon the baton elements to move them in and out of engagement with the cams. The end of each baton element opposite the pivot is equipped with a striker surface adapted to engage a tone bar and produce an audible indication. The baton elements are not visible from the front of the housing when in a fully raised position; however, they become visible as they move within striking distance of the tone bar, thereby proving a visible as well as an audible indication of the musical interval. Proper design of the cam profile surfaces enables each baton element to represent a given musical notation, and appropriate selection of individual or simultaneous operation of the baton elements allows the simulation of any desired rhythmic variation, dependent only on the number of baton elements available in a particular note meter structure.

These and other features and advantages of the invention will be understood more readily from the following description, taken with the drawings in which:

FIG. 1 is a perspective view of a musical note meter constructed in accordance with the invention;

FIG. 2 is a plan view of the device of FIG. 1 with the top cover removed;

FIG. 3 is a front elevation view of the interior mechanism of the device;

FIG. 4 is a side elevation view with the end cover removed; and

FIG. 5 is an enlarged detail view of a baton element with the associated cam and draw bar.

FIG. 1 of the drawings shows the musical note meter in perspective. The housing for the device is indicated generally by the numeral 1. Access to the interior of housing 1 is gained through the removable cover member 3 and the removable side member 5. A decorative key board design 7 and a musical notation guide chart 9 are mounted on the front of the housing.

An electric motor 11 is located within compartment 13, and is provided with a speed reducing mechanism of conventional design (not shown) located in the end section 15. A shaft 17, which is journaled in panels 19 and 21 of housing 1, is coupled to the motor 11 by a suitable mechanical linkage indicated generally by the numeral 23. A plurality of cams 25 to 32 are fixedly mounted on shaft 17 to rotate therewith. The pivot shaft 33 is fixedly mounted in the housing 1 slightly behind and above shaft 17 on which cams 25 to 32 are located. A plurality of arcuately shaped baton elements 35 to 42 are pivotally mounted on shaft 33 and adapted to engage, respectively, cams 25 to 32. Baton elements 35 to 42 are moved into and out of engagement with cams 25 to 32 by means of draw bar members 45 to 52, which are slidably mounted under cover plates 53 and 54 on the top of housing 1.

Each of the baton elements 35 to 42 has a hammer element 55 to 62 mounted on the end furthest from the pivot shaft 33. These hammer elements are adapted to strike tone bar 64 to produce an audible and visible indication as the baton element is actuated by travelling over the peripheral surface profile of its associated cam. The hammer action of the baton elements is increased by providing enlarged heads 65 to 72, which increase the weight of the arm near the striking surface, and thereby facilitate the sound production. The tone bar 64 is not fixedly mounted within the housing member 1, but rather is provided with resilient supports (not shown) in order that the bar will continue to sound after being struck.

The action of an individual cam and baton element assembly will be understood more readily by referring to FIGS. 4 and 5 where a single operating unit may be observed. Cam 31 is provided with 12 upright profile segments such as segment 73. The depending portion 75 on baton element 41 is located intermediate the hammer element 61 and pivot shaft 33 and serves as a cam follower and is adapted to ride over the profile segment 73 of cam 31. When draw bar 51 is moved to its leftmost position, as seen in FIGS. 4 and 5, the depending portion 75 will be in contact with cam 31. As depending portion 75 follows cam 31, hammer element 61 will be caused to strike tone bar 64 when the baton element 41 drops after depending portion 75 has passed over each profile segment 73. The direction of rotation of cam 31 is shown as being clockwise in FIG. 4, and the linear slope of profile segment 73 is set at an angle sufficiently small to prevent chatter of the baton element 41 as the depending portion 75 is caused to engage the sloping surface of segment 73. When the draw bar member 51 is moved to its rightmost position, as seen in FIGS. 4 and 5 the projecting lever extending upwardly from the baton element 41 causes the baton element to be moved up and out of engagement with cam 31, and where it becomes inactive.

The cam 31 shown in FIGS. 4 and 5 has twelve profile segments and corresponds to the triplet notation, shown as the seventh element on the musical notation guide chart 9 of FIG. 1. Twelve segments are utilized here because twelve eighth note triplets are present in each whole measure of common time. Cam 32, which corresponds to the sixteenth note notation, would have sixteen profile segments (see the eighth notation on guide chart 9 of FIG. 1), cam 30 would have eight profile segments (see the sixth notation on guide chart 9 of FIG. 1), and so on with any desired musical notation. While the guide chart of FIG. 1 shows eight musical notations, it is to be understood that this number could be extended indefinitely by increasing the number of cams and associated linkages utilized in the musical note meter of the present invention.

By actuating the appropriate draw bar elements one or more of the cams and its associated linkages may be actuated simultaneously to illustrate two or more sets of fundamental beats occurring within a given time interval and demonstrating the relative time values of the various musical notation. The use of appropriately designed cams will enable the device to indicate audibly and visibly the relationship of any desired secondary rhythm to a fundamental primary rhythm. The device can also be utilized as a simple metronome having predetermined digital values selectable by the actuation of appropriate draw bars. The particular digital values obtainable will, of course, depend upon the speed of the motor unit 11 employed.

While the invention has been shown and described with particular reference to a preferred embodiment, it will be understood by those skilled in the art that various changes in form and details may be made without departing from the spirit and scope of the invention.

What is claimed is:
1. A musical note meter comprising a motor, a shaft connected to said motor, a plurality of linear profile cams mounted on said shaft, each of said cams having a predetermined number of profile segments to represent a desired rhythm to be reproduced, an arcuately shaped baton element having two ends with a depending cam follower intermediate said ends and engageable with each of said cams, a pivot shaft, one end of each of said baton elements being pivotally mounted on said pivot shaft, a striker member mounted on the other end of each of said baton elements, a projecting lever integral with said one end of each of said baton elements and extending away from said baton element in a direction opposite from said depending cam follower, a draw bar member mounted adjacent each baton element and adapted to engage the projecting lever on each baton element to move said baton element into and out of engagement with its associated cam, and a tone bar mounted adjacent said baton elements and extending parallel to the shaft on which said linear profile cams are mounted in position to be struck by the striker members on said baton elements when said baton elements engage said cams, whereby a plurality of said baton elements can be operated simultaneously to produce a desired predetermined combination of rhythmic patterns without objectionable chatter.

2. The combinaiton according to claim 1 including a housing, said housing having a front portion through which the action of the baton elements may be observed, thereby furnishing a visible indication of a predetermined selected pattern.

3. The combination according to claim 2 wherein said draw bar members are slidably mounted beneath a cover plate member on the top of said housing.

References Cited in the file of this patent
UNITED STATES PATENTS

| | | |
|---|---|---|
| 618,336 | Doerfer | Jan. 24, 1899 |
| 1,195,077 | Parkinson | Aug. 15, 1916 |
| 1,261,382 | Grimson | Apr. 2, 1918 |
| 1,887,857 | Miessner | Nov. 15, 1932 |
| 2,915,121 | Bloom | Dec. 1, 1959 |

FOREIGN PATENTS

| | | |
|---|---|---|
| 608,864 | France | Apr. 30, 1926 |
| 664,091 | Great Britain | Jan. 2, 1952 |
| 1,087,885 | Germany | Aug. 25, 1960 |